(12) United States Patent
Kaminski et al.

(10) Patent No.: US 12,423,067 B1
(45) Date of Patent: Sep. 23, 2025

(54) ENFORCING QUALITY PROCEDURES IN VALIDATED SYSTEMS THROUGH DATA INTEGRATION AND SYNCHRONIZATION USING AN OBJECT-ORIENTED DATA MODEL

(71) Applicant: KETRYX CORPORATION, Somerville, MA (US)

(72) Inventors: Erez Kaminski, Arlington, MA (US); Jan Pöschko, Vienna (AT)

(73) Assignee: KETRYX CORPORATION, Somerville, MA (US)

( * ) Notice: Subject to any disclaimer, the term of this patent is extended or adjusted under 35 U.S.C. 154(b) by 0 days.

(21) Appl. No.: 18/959,601

(22) Filed: Nov. 25, 2024

(51) Int. Cl.
  *G06F 8/35* (2018.01)
  *G06F 8/77* (2018.01)
  *G06Q 30/018* (2023.01)

(52) U.S. Cl.
  CPC .......... *G06F 8/35* (2013.01); *G06F 8/77* (2013.01); *G06Q 30/018* (2013.01)

(58) Field of Classification Search
  None
  See application file for complete search history.

(56) References Cited

U.S. PATENT DOCUMENTS

| | | | | |
|---|---|---|---|---|
| 2004/0216085 A1* | 10/2004 | Wilson | ...................... | G06F 8/24 717/106 |
| 2004/0216087 A1* | 10/2004 | Wilson | ...................... | G06F 8/24 717/116 |
| 2010/0218164 A1* | 8/2010 | Hsueh | .................... | G06Q 10/06 717/104 |
| 2011/0010686 A1* | 1/2011 | Wilson | ...................... | G06F 8/24 717/104 |
| 2011/0154288 A1* | 6/2011 | Kung | ........................ | G06F 8/24 717/105 |
| 2022/0309418 A1 | 9/2022 | Chivukula et al. | | |
| 2023/0208869 A1 | 6/2023 | Bisht et al. | | |

FOREIGN PATENT DOCUMENTS

EP  3314409 B1  6/2023

OTHER PUBLICATIONS

International Search Report and Written Opinion for Application No. PCT/US2024/057554 dated Jul. 7, 2025.

* cited by examiner

*Primary Examiner* — Qing Chen
(74) *Attorney, Agent, or Firm* — MARSHALL, GERSTEIN & BORUN LLP; Noah K. Tilton

(57) ABSTRACT

A computer-implemented method integrates data from systems into a model to manage quality, generating artifacts. A computing system receives data for quality management, creating artifacts. A computer-readable medium stores instructions for data integration and artifact generation.

20 Claims, 3 Drawing Sheets

ENFORCING QUALITY PROCEDURES IN VALIDATED SYSTEMS THROUGH DATA INTEGRATION AND SYNCHRONIZATION USING AN OBJECT-ORIENTED DATA MODEL

FIELD OF THE INVENTION

The present aspects relate to computer-implemented methods for managing quality procedures and change management in the development and release of validated systems, and more particularly, to integrating and synchronizing data from multiple remote systems into an object-oriented data model for computational enforcement of quality procedures, such as parsing, mapping, and synchronizing changes between remote systems and the object-oriented data model.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In the domain of software development and quality management, traditional approaches have often been document-centric, relying heavily on ad hoc processes for the management of quality control, risk analysis, and change management. These conventional systems typically utilize extensive documentation, such as large Excel spreadsheets or Word documents, to detail requirements, testing protocols, and risk analyses. This document-based approach can lead to challenges in ensuring the traceability and granularity necessary for rigorous quality and compliance management, especially in highly regulated industries such as healthcare and pharmaceuticals.

Further, the reliance on ad hoc documentation hinders the efficiency of software development cycles and the ability to respond quickly to changes or updates. The advent of computerized systems has introduced some improvements in managing the lifecycle of software development and quality assurance processes. However, these systems often lack the flexibility and integration needed to seamlessly connect various aspects of software development, such as specifications, code, testing, and risk management. The fragmentation across different tools and platforms results in silos of information, complicating efforts to maintain a holistic view of the development process and ensure compliance with regulatory standards. Additionally, while some systems offer functionalities for tracking dependencies and managing change, they do not provide the level of granularity and traceability required for complex software products, particularly those in the medical device sector where regulatory compliance and patient safety are of paramount importance.

Furthermore, in recent years, the intersection of software development and quality management systems (QMS) has become increasingly significant, particularly in industries subject to stringent regulatory requirements such as healthcare and finance. Traditional methodologies often struggle to accommodate the rapid pace of software development and the complex dependencies inherent in modern software projects. This has led to a growing need for systems that can more effectively manage the lifecycle of software products, ensuring compliance with regulatory standards while facilitating a more integrated and efficient development process. The challenge has been further compounded by the transition to cloud-based and embedded systems, where the dynamic nature of software changes demands robust control mechanisms to manage risk and ensure reliability. Conventional solutions have not kept pace. Moreover, the reliance on Software of Unknown Provenance (SOUP) and open source components introduces additional complexities in assessing and managing risk.

Given the limitations of conventional approaches in compliant software development and quality management, there are significant opportunities for the development of improved platforms and technologies to enhance the ability to deliver high-quality software products in a timely and regulatory-compliant manner, and strengthen the assurance of software reliability and safety in critical applications.

BRIEF SUMMARY OF THE INVENTION

In one aspect, a computer-implemented method for computational enforcement of quality procedures of a validated system includes: (1) receiving, via one or more processors, data from a plurality of remote systems associated with the validated system, wherein the data includes information related to at least one of requirements, specifications, tests, risks, anomalies, complaints, change requests, corrective and preventive actions, dependencies, or other configuration items associated with the validated system; and (2) integrating, via the one or more processors, the received data into an object-oriented data model for managing quality procedures and change management in the development and release of the validated system, wherein the integration includes: (a) parsing the received data using a plurality of parsers each configured for a respective one of the plurality of remote systems; (b) mapping the parsed data to corresponding items within the object-oriented data model; and (c) synchronizing, via the one or more processors, changes between the plurality of remote systems and the object-oriented data model by monitoring the remote systems for changes; and (3) generating, via the one or more processors, one or more artifacts, wherein the artifacts are automatically generated based on the integration, synchronization, and tracking of data within the object-oriented data model.

In another aspect, a computing system for computational enforcement of quality procedures of a validated system includes: one or more processors; and one or more memories, having stored thereon instructions that, when executed, cause the computing system to: (1) receive data from a plurality of remote systems associated with the validated system, wherein the data includes information related to at least one of requirements, specifications, tests, risks, anomalies, complaints, change requests, corrective and preventive actions, dependencies, or other configuration items associated with the validated system; (2) integrate the received data into an object-oriented data model for managing quality procedures and change management in the development and release of the validated system, wherein the integration includes parsing the received data using a plurality of parsers each configured for a respective one of the plurality of remote systems, mapping the parsed data to corresponding items within the object-oriented data model, and synchronizing changes between the plurality of remote systems and the object-oriented data model by monitoring the remote systems for changes; and (3) generate one or more artifacts, wherein the artifacts are automatically generated based on the integration, synchronization, and tracking of data within the object-oriented data model.

In yet another aspect, a non-transitory computer-readable medium has stored thereon instructions that, when executed, cause a computer to: (1) receive data from a plurality of remote systems associated with the validated system, wherein the data includes information related to at least one of requirements, specifications, tests, risks, anomalies, complaints, change requests, corrective of preventive actions, dependencies, or other configuration items associated with the validated system; (2) integrate the received data into an object-oriented data model for managing quality procedures and change management in the development and release of the validated system, wherein the integration includes parsing the received data using a plurality of parsers each configured for a respective one of the plurality of remote systems, mapping the parsed data to corresponding items within the object-oriented data model, and synchronizing changes between the plurality of remote systems and the object-oriented data model by monitoring the remote systems for changes; and (3) generate one or more artifacts, wherein the artifacts are automatically generated based on the integration, synchronization, and tracking of data within the object-oriented data model.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof.

There are shown in the drawings arrangements which are presently discussed, it being understood, however, that the present embodiments are not limited to the precise arrangements and instrumentalities shown, wherein.

DETAILED DESCRIPTION

Figure 1:
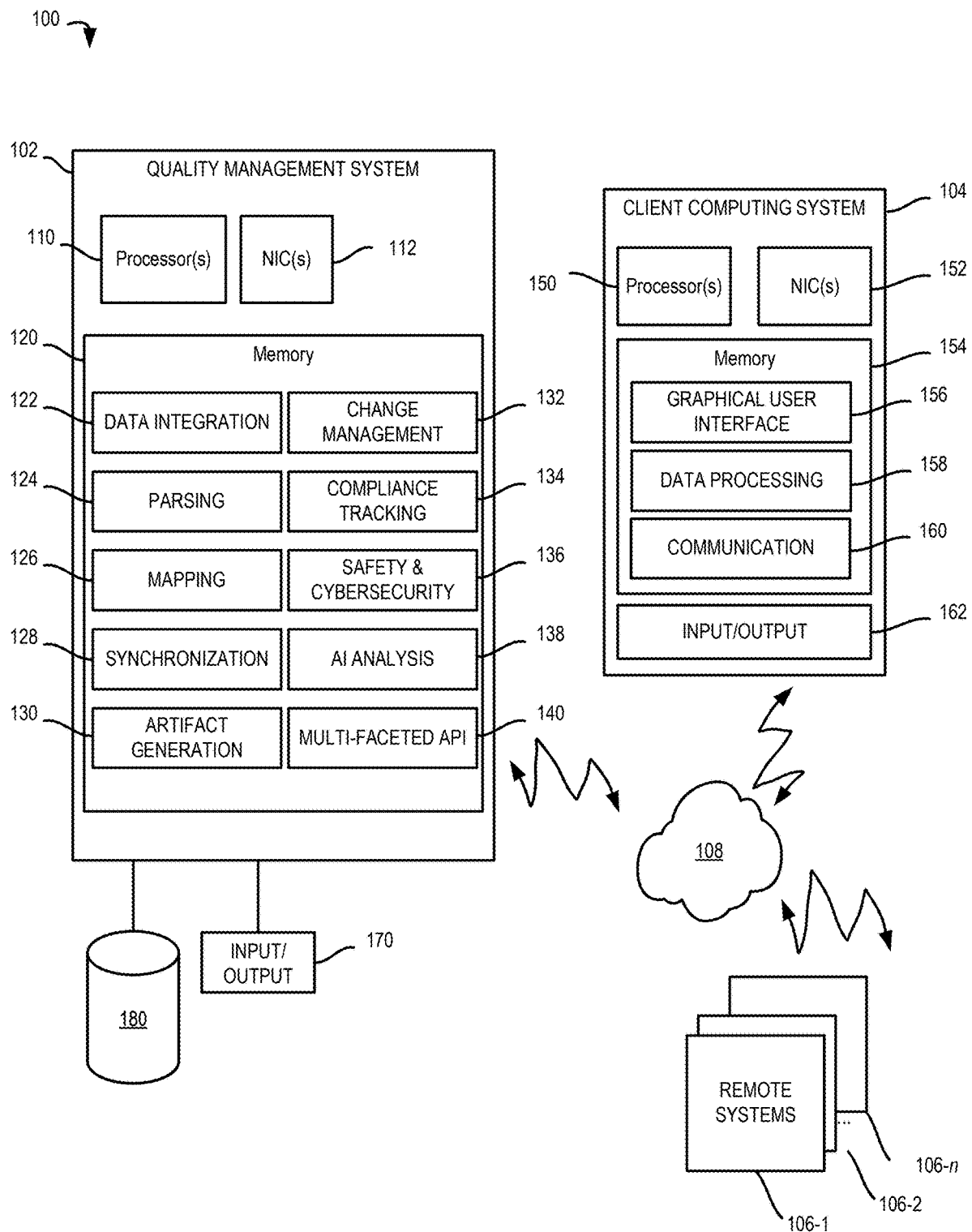
FIG. 1 depicts a computing environment for the computational enforcement of quality procedures of a validated system configured to integrate data from a plurality of remote systems into an object-oriented data model to manage quality procedures and change management, according to some aspects.

Given the complexity and evolving nature of software development, particularly in regulated industries such as healthcare, there is a pressing need for systems that can ensure the quality, safety, and compliance of software products. Traditional methods of managing software development processes, which often rely on document-based approaches, are increasingly proving to be inadequate in addressing the dynamic and intricate requirements of modern software projects. This is especially true in environments where regulatory compliance, such as adherence to regulatory guidelines (e.g., FDA guidelines), is mandatory. The present techniques introduce a comprehensive suite of tools and methodologies designed to revolutionize how quality management systems (QMS) are implemented, how software development processes are managed, and how compliance with regulatory standards is achieved.

The present techniques provide a comprehensive approach to computational enforcement of quality procedures for validated systems, leveraging the power of object-oriented data models and artificial intelligence (AI) to enhance the development, release, and regulatory compliance of such systems. Herein the term "validated system" generally refers to a system that has undergone a rigorous evaluation process to ensure that it meets predefined specifications, standards, and regulatory requirements. This process may include a series of tests, analyses, and verifications to confirm that the system functions as intended, is reliable, and is safe for its designated use. In industries such as healthcare, pharmaceuticals, and aerospace, where systems can have a direct impact on human lives and safety, the validation process is particularly critical. It encompasses not only the initial verification of system capabilities but also ongoing assessments to maintain compliance as system components, or operational environments evolve. A validated system, therefore, represents a system that has been thoroughly vetted to meet the highest standards of quality and reliability, ensuring that it fulfills its intended purpose effectively and safely.

The types of products that can be included in the present computational enforcement of quality procedures encompass a wide range of systems and applications now known or later developed, particularly those requiring rigorous validation and quality assurance. These products can include, but are not limited to, medical devices, pharmaceutical systems, automotive systems, aerospace systems, consumer electronics, energy systems, transportation systems, defense/military systems, or any other types of validated systems now known or later developed. Specifically, the products can benefit from advanced change management procedures for AI systems, allowing for updates and modifications without the need for re-approval from regulatory bodies such as the FDA. Computerized Quality Assurance (CQA) systems enforce quality and organizational procedures across IT systems, ensuring a holistic view and management of the system's lifecycle. The use of a predetermined change control plan enables the governance of updates to models or systems, facilitating the incorporation of adaptive algorithms in medical devices and other critical systems. Further, the implementation of a traceability matrix ensures comprehensive coverage of use cases by requirements, and all requirements by specifications and tests, which is vital for compliance in highly regulated industries. The cross-system enforcement of organizational procedures across different IT systems, rather than within a single product system, enhances compliance and security measures. The validated change management rule engine, which incorporates the collective experience of 25 years at the FDA into its models, checks compliance with predetermined rules, allowing for autonomous updates to systems according to validated procedures. These products and systems benefit from a deeply integrated, connected system that leverages AI and managed processes to handle the complexities associated with managing hundreds of thousands of items. The core data model, for example, maintains an object-oriented model of configuration items, improving upon conventional document-based management systems by offering granularity in managing individual items. This approach facilitates rapid updates and precise management of changes, significantly improving the efficiency and reliability of the development process. Additionally, the integration of AI for analyzing items within the object-oriented data model and the management of safety and cybersecurity requirements are critical for ensuring that the products meet all necessary safety, security, and regulatory standards.

These techniques address the intricate challenges of managing quality procedures and change management across a variety of sectors, including but not limited to medical devices, pharmaceutical products, automotive systems, aerospace systems, consumer electronics, energy systems, railroad or other transportation systems, defense systems, or any other types of validated systems now known or later developed. By integrating data from a multitude of remote systems and utilizing an object-oriented data model, the present techniques facilitate a more granular and efficient management of quality procedures, significantly improving upon traditional document-based methods. The present techniques contribute to improved memory usage through the efficient management of data within the object-oriented data model. By capturing snapshots of changed data and creating new records within the model to document these changes, the system ensures that memory resources are utilized effectively, without the redundancy often associated with traditional document-based systems. This not only optimizes memory usage but also facilitates quicker access to relevant data, thereby enhancing the overall performance of the system.

One of the significant improvements introduced by this system is in the realm of computerized quality control. By leveraging object-oriented principles and advanced computational techniques, the system enables a more granular, integrated and flexible approach to quality management. Unlike traditional document-based systems, which can be cumbersome and inflexible, the disclosed system allows for the management of individual items or components of a software project. This granularity not only facilitates a more precise control over the quality management process but also significantly enhances the ability to respond to changes and updates in the software development lifecycle. The system's object-oriented approach extends to requirements, specifications, tests, code, and other configuration items, enabling a seamless integration of these elements and ensuring that each component is subject to rigorous quality control measures. Specifically, one of the primary improvements offered by the present techniques is the enhanced processing capabilities provided by the integration of data into an object-oriented data model. This model allows for the parsing, mapping, and synchronization of data from various remote systems, enabling a more dynamic and responsive approach to managing quality procedures and change management. This method not only reduces software development data entry and the potential for errors but also facilitates quicker decision-making and response to changes, thereby improving overall processing efficiency. The use of multiple parsers, each configured for a respective remote system, ensures that data is accurately integrated into the model, thereby enhancing the overall processing efficiency of the system.

The present AI-driven change management and quality assurance methods and systems, represent improvements in the functioning of a computer, and/or an improvement to another technology or technical field, particularly the field of software quality management for highly regulated industries such as medical device manufacturing. By embedding the collective experience of 25 years at the FDA into its models, this system offers a nuanced and deeply informed approach to managing the lifecycle of products, ensuring they meet the stringent standards set by regulatory bodies. For example, the present techniques may use of AI to automate and refine the change management process for AI systems. Traditional methods of managing changes in such systems have been ad hoc, relying on rudimentary software that struggles to keep pace with the rapid evolution of technology. In contrast, the present techniques can use AI to drive, check, and manage complexities associated with updating models and deploying new updates, thereby streamlining the process and allowing for quicker, more efficient rollouts of validated systems. This capability is advantageous for companies required to maintain compliance with regulatory standards, such as those enforced by the FDA, which are concerned with the entire lifecycle development process of medical devices.

As noted, the present techniques' approach to quality assurance and change management is markedly advanced through its use of an object-oriented data model, which model moves away from the traditional document-based systems, which are often unwieldy and prone to errors, towards a more granular, item-based system. This shift allows for a more precise management of individual items, such as a single requirement or test, and how these correspond to each other. Such granularity facilitates quicker iterations and development, as updates do not require a complete overhaul of documentation but can be made on a much more targeted basis. Through the use of object-orientation, the system is able to integrate with other tools and IT systems through APIs and connected systems further enhances its utility and efficiency. This deep integration allows for cross-system enforcement of organizational procedures, ensuring that quality and compliance standards are uniformly applied across different platforms. The ability to connect and synchronize with external systems, such as codebases and project management tools, without being captive to an inflexible platform, represents a significant improvement in the technology's functionality. It enables developers to continue using their preferred tech stack while still applying rigorous change management and process enforcement, a key differentiator of this invention from other systems in the market.

Still further, the integration of AI with an object-oriented system in this invention provides improvements to software quality management, especially for regulated industries such as medical device manufacturing. At the core of this integration is the object-oriented data model, which represents a significant departure from traditional document-based quality management systems. In conventional systems, managing quality procedures often involves cumbersome and error-prone document handling, such as large spreadsheets or text documents that detail requirements and testing protocols. This invention, however, utilizes an object-oriented approach, where each element of the software development process—be it a requirement, specification, test case, or risk element—is treated as an individual object. This granularity allows for more precise and efficient management of each component, facilitating quicker iterations and more targeted updates without the need to overhaul entire documents. For instance, the AI can automatically suggest tests for specific risk controls based on the analysis of related objects, or identify requirements that have not yet been associated with corresponding tests. This capability ensures that no aspect of the software development process is overlooked, enhancing the thoroughness and reliability of quality assurance practices. Furthermore, AI algorithms may be used to navigate and manage the object-oriented structure, to enable dynamic updates and changes to be made with unprecedented speed and accuracy. This is particularly valuable in regulated industries, where the ability to swiftly adapt to new regulations or findings without compromising compliance is crucial. The AI-driven system can manage the complexities associated with hundreds of thousands of items, driving checks and updates across the entire lifecycle of a product.

The utilization of object orientation principles in conjunction with AI models presents a transformative approach to managing and reasoning about objects across different systems, particularly in the context of quality management for regulated industries. This integration enables the AI model to understand and manipulate data at a granular level, treating each requirement, specification, test case, risk element, and other configuration item as distinct objects with their own properties and relationships. This object-oriented approach is pivotal for training AI models that can effectively reason about objects from different systems, offering a level of precision and adaptability not achievable with conventional quality management software. For example, in an object-oriented system, each element of the software development process is encapsulated as an object, which can include not just data, but also the methods to manipulate that data. This encapsulation allows the AI model to interact with and analyze these objects individually or in relation to each other, enabling complex reasoning and decision-making processes. For example, the AI can be trained to identify dependencies between objects, such as how a change in a requirement object might necessitate changes in related test case objects. This capability enables the methods and systems to maintain integrity and compliance of the software development process, especially in highly regulated environments where the stakes of oversight are high.

Such approaches would not work using conventional quality management software that is non-object-oriented and/or non-AI, due to the limitations of such systems in handling data granularity and dynamic relationships. As noted, traditional quality management systems often rely on document-based or linear data structures, where information is stored in large, monolithic documents or spreadsheets. This structure makes it difficult to manage and reason about individual elements of the software development process in isolation or to dynamically update relationships between elements as changes occur. Without the ability to treat each element as a distinct object, these systems lack the flexibility and precision required for effective quality management in complex, regulated environments. Further, conventional systems without AI capabilities are unable to leverage machine learning algorithms to analyze patterns, predict outcomes, or suggest actions based on the data contained within these objects. This lack of predictive and adaptive functionality further limits the effectiveness of traditional quality management software in managing the complexities of modern software development, particularly in fields where regulatory compliance and rapid adaptation to new standards or findings are paramount.

Additionally, the invention's AI algorithms enable managing complex data models and enforcing traceability in quality management systems. By analyzing data within an object-oriented model, the AI can suggest tests for specific risk controls or identify requirements that lack corresponding tests, thereby ensuring thorough coverage and compliance. This level of detail and precision in managing quality procedures marks a substantial improvement over traditional methods, allowing for more rapid iteration and development.

Another area where the disclosed system offers substantial improvements is in the interleaving of specification, code, and testing. By tightly integrating these aspects of software development, the system ensures that they form complete and self-contained units. This integration allows for a more efficient and effective development process, where changes in specifications can be immediately reflected in the code and testing protocols. Furthermore, the system's ability to connect software specifications, code, and testing into a cohesive whole significantly reduces the risk of errors and omissions, thereby enhancing the overall quality and reliability of the software product.

The system also introduces a novel approach to managing software dependencies through the control of dependencies in the configuration management (CM) tool. By automatically generating a Software Bill of Materials (SBOM) directly from source code repositories and placing these dependencies under configuration management, the system provides a robust mechanism for managing both direct and transitive dependencies. This capability enables ensuring the reliability and performance of software products, as it allows for a comprehensive risk analysis of dependencies and ensures that all regulator-required metadata is properly managed. The system's ability to handle different levels of the dependency tree with precision and to provide significant metadata regarding performance and reliability represents a significant advancement in the field of software quality management.

In addition to these technical improvements, the system also offers a range of tools and features designed to enhance the user experience and facilitate compliance with regulatory standards. For example, the system includes a graphical user interface (GUI) simulator that enables clients to quickly develop their interfaces, generate associated specifications, and create verification specifications and training materials. This tool not only accelerates the development process but also ensures that the resulting products are in compliance with regulatory requirements. This tool significantly accelerates the development process by providing a visual and interactive means to design and test user interfaces, thereby reducing the cognitive load on developers and enhancing the overall user experience of the development tools.

The disclosed system also introduces the Ketryx Query Language (KQL), a powerful tool for querying an Application Lifecycle Management (ALM) system and its graph structure. KQL enables users to navigate the intricate relationships between configuration items, facilitating a deeper understanding of the software development process and enhancing the ability to manage and control quality and compliance. This capability is particularly valuable in regulated industries, where the ability to trace and verify the relationships between different components of a software project is essential for compliance.

Further, the disclosed system introduces an innovative way to manage and analyze risks associated with both cyber security and reliability through a user-friendly interface and guided workflow. This aspect of the system leverages advanced algorithms to assess and mitigate potential risks, thereby improving the overall security and reliability of the software being developed. By automating the risk analysis process and integrating it seamlessly with the rest of the development workflow, the system reduces the burden on developers and quality assurance teams, leading to more efficient use of network resources and a reduction in the time required to bring a product to market.

Another significant improvement introduced by the disclosed system is the control of dependencies in the Configuration Management (CM) tool. By automatically generating a Software Bill of Materials (SBOM) directly from source control systems and managing dependencies at various levels, the system offers a more robust and transparent way to handle open source and third-party components. This feature not only improves the reliability and security of the software by enabling detailed risk analysis of dependencies but also optimizes memory usage by ensuring that only necessary components are included in the final product. Further, the use of artificial intelligence (AI) to encapsulate the properties of Software of Unknown Provenance (SOUP) and to objectively assess compliance with standards represents an advantageous improvement to managing the complexities of software compliance. Specifically, by analyzing items within the object-oriented data model, AI can generate suggestions for tests based on identified risk controls, identify requirements without corresponding tests, and provide an overview of system activities to facilitate decision-making. This AI-driven analysis not only improves the efficiency of quality procedures and change management but also enhances the system's ability to enforce regulatory compliance and quality assurance. Moreover, the present techniques support regulatory compliance by tracking relationships between items within the data model, managing safety and cybersecurity requirements, and authenticating electronic signatures associated with changes, thereby ensuring that the validated system meets predetermined regulatory standards.

Overall, the disclosed systems and methods include significant improvements in the field of software quality management. By integrating advanced computational techniques, object-oriented principles, and AI-driven tools, the present techniques offer a comprehensive solution for managing the quality, safety, and compliance of software products. The present techniques improve software quality management, improving compliance, enhancing quality control, and streamlining the development process. By adopting an object- or item-based system, the disclosed methodology allows for more granular control over individual elements of the software development process. This approach not only facilitates a more efficient management of changes but also enhances the traceability and accountability of every action taken within the system. The granularity provided by this method significantly improves processing efficiency, as changes can be implemented and tracked at the item level without the need to navigate through extensive documentation.

Exemplary Computing Environment

FIG. 1 describes a computing environment 100 for the computational enforcement of quality procedures of a validated system, integrating data from a plurality of remote systems into an object-oriented data model to manage quality procedures and change management in the development and release of the validated system, according to some aspects. The computing environment 100 includes a quality management system 102, a client computing system 104 and one or more remote systems 106. The computing environment 100 may be communicatively coupled to (and/or include, in some aspects) an input/output (I/O) device 170 and an electronic database 180. The quality management system 102, the client computing system 104 and the one or more remote systems 106 may be communicatively coupled by an electronic network 108.

The quality management system 102 may include a processor 110, a network interface controller (NIC) 112 and a memory 120. The processor 110 may include any number of processors and/or processor types, such as central processing units (CPUs), graphics processing units (GPUs), and others, configured to execute software instructions stored in the memory 120. The processor 110 may execute instructions stored in the memory 120. The processor 110 may be a single-core or multi-core processor, providing the capability to handle multiple tasks simultaneously through parallel processing. It includes a variety of internal components such as arithmetic logic units (ALUs), control units, and caches, which work together to execute complex computational tasks. The processor 110 may also support advanced features such as virtualization, which allows multiple operating systems to run concurrently on a single physical machine, and power management technologies to optimize energy consumption. Additionally, the processor 110 is designed to interface with other system components, such as memory, storage, and input/output devices, facilitating a seamless and efficient data flow within the computing environment. The processor 110, in addition to traditional CPU capabilities, may also encompass Graphics Processing Units (GPUs) and Application-Specific Integrated Circuits (ASICs) to enhance its computational power and efficiency, particularly for tasks that require specialized processing. GPUs are designed to handle parallel processing tasks efficiently, making them ideal for graphics rendering, video processing, and certain types of scientific computations. Their architecture allows for the simultaneous execution of thousands of threads, significantly accelerating tasks that can be parallelized. This makes GPUs particularly valuable in fields such as machine learning, deep learning, and complex simulations, where they can perform computations much faster than general-purpose CPUs. ASICs, on the other hand, are custom-designed chips tailored for a specific application or task. By optimizing the hardware to perform particular functions, ASICs can achieve higher performance and lower power consumption compared to general-purpose processors. By incorporating GPUs and ASICs, the processor 110 can offer a versatile and powerful computing platform capable of handling a wide range of tasks, from general-purpose computing to specialized applications that require intensive data processing.

The NIC 112 enables the computing environment 100 to connect and communicate over networks with a multitude of remote systems to exchange data, access to services, and integrate with external systems during operation of validated systems in regulated industries. The NIC 112 may include hardware and software elements that together facilitate robust and secure networking capabilities. On the hardware side, the NIC 112 may include a variety of physical interfaces and connectors to support different network types, such as Ethernet for wired connections, and antennas for wireless communications like Wi-Fi or Bluetooth. It also contains the necessary electronic circuitry to transmit and receive data over these networks, adhering to the specific protocols and standards required for each type of connection. The software component of the NIC 112 may include drivers and firmware that enable the operating system of the computing environment 100 to recognize and utilize the networking capabilities of the NIC. This software is responsible for the configuration of network settings, management of network connections, and the implementation of security protocols to ensure the safe transmission of data. Advanced features might also be supported, such as virtual LAN (VLAN) tagging for network segmentation, network booting capabilities, and support for software-defined networking (SDN), which provides greater flexibility and control over network resources. Further, the NIC 112 may offer features aimed at enhancing performance and security, including offloading tasks from the main processor to reduce CPU load, encryption capabilities for secure data transmission, and support for high-speed networking standards to accommodate the bandwidth requirements of data-intensive applications.

The memory 120 may include volatile and/or non-volatile memory, such as random access memory (RAM), read-only memory (ROM), and others, having stored thereon one or more sets of computer-executable instructions. The NIC 112 includes any suitable network interface controller(s), facilitating networking over the network between the computing environment 100 and the plurality of remote systems associated with the validated system. The memory 120 may store and retrieve data and instructions for the operation of the computing environment 100. The memory 120 may include various types of storage technologies, each designed to fulfill specific needs within the system. The memory 120 may interface with the processor 110 and other components of the computing environment 100, ensuring that data can be stored and retrieved efficiently. This may be facilitated by a memory controller, which manages the data flow between the processor and the memory, optimizing access times and bandwidth utilization. The memory 120 includes a plurality of modules, each being a respective set of computer-executable instructions. Each of these modules will now be individually described. It should be appreciated that the modules are inter-operable, and that there may be more or fewer modules, in some aspects.

The memory 120 may include a data integration module 122 that integrates received data into the object-oriented data model. The memory 120 may include instructions for executing processes that enable the computational enforcement of quality procedures, facilitating the integration of data from the quality management system 102, the client computing system 104, and one or more remote systems 106 through the electronic network 108. These instructions may support the dynamic management of change within AI subsystems, enforce cross-system organizational procedures, and ensure compliance with regulatory standards through a validated change management rule engine. Additionally, the memory 120 may contain instructions for leveraging AI and machine learning algorithms to analyze, act upon, and establish traceability of data within the object-oriented model, thereby enhancing the system's ability to adapt to changes and maintain compliance with industry standards such as those set by one or more regulators. The integration module 122 may integrate received data into the object-oriented data model. For example, when a new regulatory requirement is introduced that affects the design of a medical device within the validated system, the data integration module 122 may receive this information from a remote system 106, such as a regulatory database.

The memory 120 may include instructions for the data integration module 122 to receive a new requirement, identify its implications for existing objects within the object-oriented data model (such as design specifications and associated risk assessments), and integrate this requirement as a new object. Subsequently, the data integration module 122 may trigger an analysis by the AI/LLM component to evaluate the impact of this new requirement on the current design and testing protocols. This process might result in the generation of suggestions for new or modified test cases or other configuration items to ensure the product meets the updated regulatory standards. These suggestions are then presented to the development team through the client computing system 104, ensuring that the validated system remains in compliance with industry regulations while minimizing software development oversight and accelerating the adaptation process.

The memory 120 may include a parsing module 124 that parses the received data using a plurality of parsers, each configured for a respective one of the plurality of remote computing systems. The parsing module 124 may include instructions for automatically identifying and extracting relevant information from data received from various sources, such as Jira, codebases, and regulatory databases, using the specific parser tailored for each data source. This process enables the computing environment 100 to accurately interpret and integrate data into the object-oriented data model, regardless of the format or system from which the data originates. For example, when a change is made in a project management tool like Jira, the corresponding parser within the parsing module 124 can extract the details of the change, enabling the system to create a new item or update an existing object within the object-oriented model. This ensures that all changes and updates are consistently reflected across the quality management system 102, the client computing system 104, and the one or more remote systems 106, facilitating synchronization and traceability of data across the computing environment 100.

The memory 120 may include a mapping module 126 that maps the parsed data to corresponding items within the object-oriented data model. The mapping module 126 may include instructions for identifying the most relevant object or set of objects within the data model that correspond to the parsed data, facilitating the automatic association of incoming data with existing elements such as requirements, specifications, test cases, or risk elements. For instance, if the parsed data pertains to a new software requirement from a project management tool like Jira, the mapping module 126 can determine the appropriate location within the object-oriented data model to place this requirement, ensuring it is linked to related specifications and test cases. This process supports the system's ability to maintain an up-to-date and coherent representation of the validated system's state, enabling efficient change management and quality assurance processes across the computing environment 100, including the quality management system 102, the client computing system 104, and one or more remote systems 106.

The mapping module 126 may create and modify object-oriented data models that serve as the foundation for managing and tracking the development and validation of systems. At a fundamental level, these object-oriented data models are structured representations of the system's components, including but not limited to requirements, specifications, test cases, and risk elements. Each component within the model is represented as an "object," which encapsulates both data (attributes) and behaviors (methods) relevant to that component. This encapsulation allows for a modular and flexible approach to system development, where objects can interact with one another while maintaining a degree of independence. Objects within these data models may be stored in the memory 120 of the computing environment 100, in a structured database or a similar data storage solution that supports object-oriented principles. In some aspects, these modules may be stored in the electronic database 180. Of course, the computing environment 100 may include multiple deployments of electronic databases (e.g., one or more relational databases, one or more key-value stores, one or more in-memory databases, etc.). The electronic database 180 may be configured to preserve relationships and hierarchies between different objects, enabling complex queries and operations that reflect the interconnected nature of the system's components. For example, an object representing a software requirement may be linked to multiple objects representing test cases designed to validate that requirement, and these relationships may be maintained within the storage system to ensure data integrity and coherence.

The mapping module 126, through its instructions, may dynamically interact with this storage system to update the object-oriented data model as new data is received and parsed. When the module identifies new or modified data that corresponds to a particular aspect of the system, it either creates a new object or updates an existing object within the model, ensuring that the data model accurately reflects the current state of the system. This includes determining the appropriate relationships and dependencies between objects, such as linking new requirements to relevant specifications and test cases. By maintaining an up-to-date and coherent object-oriented data model, the mapping module 126 enables the computing environment 100 to effectively support change management and quality assurance processes. This approach facilitates a comprehensive understanding of the system's components and their interrelations, supporting efficient decision-making and ensuring that the system meets all necessary regulatory standards and quality benchmarks. The object-oriented data model, stored and managed within the environment 100, thus becomes a central repository of knowledge that drives the development, validation, and maintenance of complex systems in a regulated environment.

The memory 120 may include a synchronization module 128 that synchronizes changes between the plurality of remote systems and the object-oriented data model by monitoring the remote systems for changes. The synchronization module 128 may include instructions for tracking updates or modifications made within any of the remote systems 106, such as changes to project management tasks in Jira or updates to code repositories. This tracking may be done continuously (e.g., via polling or in response to webhook events), or at an interval (e.g., via a cron job). The synchronization module 128 includes instructions that, when a change is detected, capture a snapshot of the change, creating a new record within the computing environment 100 that reflects this update. This process ensures that the object-oriented data model remains current and accurately represents the state of the validated system across all connected platforms. Furthermore, the synchronization module 128 may facilitate the propagation of necessary approvals or validations back to the originating system, ensuring that all changes adhere to predefined rules and compliance requirements, thereby maintaining the integrity and compliance of the development and release processes within the highly regulated environment.

The memory 120 may include an artifact generation module 130 that generates one or more artifacts based on the integration, synchronization, and tracking of data within the object-oriented data model. The artifact generation module 130 may include instructions for automatically generating reports, documentation, and compliance records that reflect the current state of the validated system. This may involve compiling data on software changes, test results, risk assessments, and regulatory compliance statuses into structured documents that can be used for internal review, regulatory submissions, or audit purposes. For example, when a new version of a medical device software is ready for release, the artifact generation module 130 can produce a release report that includes a traceability matrix showing all requirements, the tests that verify those requirements, and the results of those tests, ensuring that the product meets all necessary regulatory standards before it is launched.

The memory 120 may include a change management module 132 that captures snapshots of changed data and creates new items within the object-oriented data model to document the changes. The change management module 132 may include instructions for automatically documenting each change within the system, including who made the change, what was changed, and when the change occurred. This module is designed to maintain a comprehensive audit trail for all modifications, facilitating traceability and accountability throughout the development and maintenance of the validated system. For example, if a software engineer updates a requirement in the client computing system 104, the change management module 132 can automatically create a new version of the requirement object within the object-oriented data model, capturing the nature of the update, the identity of the engineer, and the timestamp of the change. This ensures that the system maintains a detailed history of all changes, supporting compliance with regulatory requirements and facilitating effective change control and quality assurance processes.

The memory 120 may include a regulatory compliance tracking module 134 that tracks relationships between items within the object-oriented data model to enforce regulatory compliance and quality assurance. The regulatory compliance tracking module 134 may include instructions for dynamically assessing the compliance status of each item within the system against relevant regulatory standards and quality benchmarks. This assessment may include monitoring updates to regulatory requirements and automatically evaluating the impact of these changes on existing items within the data model. For example, if a new regulatory requirement impacts the design specifications of a medical device, the module can identify all related specifications, tests, and documentation that need to be reviewed or updated to maintain compliance. Additionally, the module may generate compliance reports and dashboards that provide real-time visibility into the compliance status of the system, highlighting areas of risk and facilitating prompt corrective actions to ensure ongoing compliance with governing body regulations and other standards.

The memory 120 may include a safety and cybersecurity management module 136 that utilizes the integrated data within the object-oriented data model to identify and mitigate potential risks. The safety and cybersecurity management module 136 may include instructions for conducting comprehensive risk assessments based on the relationships and dependencies between items in the data model, such as identifying vulnerabilities in software components or potential safety issues in medical device designs. This module is capable of leveraging AI algorithms to predict risk scenarios and suggest mitigation strategies, ensuring that both safety and cybersecurity considerations are integrated into the development and maintenance processes. For instance, if a new external software dependency is added to a medical device's software, the module can automatically evaluate the security posture of this dependency, assess its impact on the device's overall cybersecurity risk profile, and recommend actions to mitigate potential vulnerabilities. Additionally, the module may facilitate the documentation of risk assessments and mitigation actions, supporting compliance with regulatory standards and guidelines related to safety and cybersecurity in medical devices.

The memory 120 may include an AI analysis module 138 that leverages artificial intelligence to analyze items within the object-oriented data model, generating suggestions for tests based on identified risk controls, identifying requirements without corresponding tests, and providing an overview of system activities to facilitate decision-making. The AI analysis module 138 may include instructions for utilizing AI and/or machine learning algorithms to automatically review the interconnectedness of items such as requirements, specifications, and tests within the data model. This process enables the identification of gaps where tests may not fully cover the associated requirements or where risk controls might not be adequately tested. For example, the module can analyze the data model to suggest specific tests for newly identified risks based on the historical data and patterns observed in similar scenarios. Additionally, the module can provide comprehensive dashboards and reports that offer insights into the overall health and compliance status of the system, highlighting areas that require attention and facilitating informed decision-making by project managers and quality assurance teams.

The memory may include a multi-faceted application programming interface (API) module 140. The multi-faceted API module 140 may include instructions for establishing connections and facilitating communication with a broad spectrum of modern API stacks and tools across various categories such as development, testing, design, and deployment. This encompasses not only source control repositories like GitHub, GitLab, and Bitbucket but also extends to project management tools like Jira and Azure DevOps, cloud storage services like Dropbox, integrated development environments (IDEs) such as Visual Studio, cloud computing platforms like Azure and AWS, and office productivity tools including Word and Excel. The API module 140 is engineered to interact with these diverse tools, enabling the computing environment 100 to retrieve code changes, documentation, test results, and deployment statuses, among other data types, for processing within the quality management system 102.

To achieve this, the API module 140 may utilize a combination of RESTful APIs, webhooks, and SDKs provided by these platforms, ensuring a robust and secure method of data exchange. It may also include custom adapters or connectors for proprietary APIs, ensuring that even specialized or in-house tools can be integrated into the computing environment's workflow. The module is designed to handle authentication protocols specific to each platform, such as OAuth for secure access, and can manage rate limits and pagination to ensure efficient data retrieval without exceeding API usage quotas.

Furthermore, the API module 140 is capable of dynamically adapting to changes in the API specifications of these tools, thanks to its modular architecture and the use of AI algorithms that can detect and adjust to API updates. This ensures that the computing environment 100 remains resilient and future-proof, capable of integrating with new tools and technologies as they emerge. By providing a unified interface for accessing a wide range of development, testing, design, and deployment tools, the multi-faceted API module 140 significantly enhances the computing environment's ability to enforce quality procedures, manage changes, and ensure regulatory compliance across the entire lifecycle of the validated system.

The high level of interoperability provided by the multi-faceted API module 140 is designed to be transparent to users, offering significant benefits that streamline and enhance the development and validation processes within the computing environment 100. One of the key advantages is enabling users to continue using their preferred development tools. The system deeply and natively integrates with best-in-class DevTools such as Jira, GitHub, GitLab, and AWS, ensuring that developers do not need to leave their preferred environments. This integration minimizes disruptions and learning curves, allowing teams to maintain productivity and focus on their core development activities.

Further, the API module 140 acts as a quality agent across all connected systems, coaching and enforcing your Quality Management System (QMS) processes directly within your preferred DevTools. This ensures that quality procedures are consistently applied across the development lifecycle, enhancing compliance and reducing the risk of errors or oversights.

Establishing traceability is another critical benefit. The computing environment 100 creates a real-time traceability matrix by overlaying product development tools and connecting all items, risks, code, and tests. This comprehensive traceability supports regulatory compliance, simplifies audits, and provides clear visibility into the development process, enabling teams to identify and address issues more efficiently.

Automation of documentation further streamlines the validation process. The computing environment 100 generates Part 11-compliant evidence and a submission-ready Design History File (DHF) from the work being done in your preferred DevTools. This automation reduces the effort required for documentation, ensuring accuracy and compliance while freeing up valuable resources for other tasks.

Ultimately, these capabilities lead to the ability to release safer software faster. By leveraging automation to generate documentation, establish traceability, and streamline processes, the computing environment 100 enables teams to accelerate their development cycles without compromising on safety or quality. This approach not only supports compliance with regulatory standards but also enhances the overall efficiency and effectiveness of the development and validation processes, allowing organizations to bring their products to market more quickly and with greater confidence in their safety and reliability.

The I/O device 170 may be configured to receive input from a user and to provide output to the user. This configuration allows for interaction between the user and the client computing system 104, facilitating the execution of various tasks and operations within the system. For example, an administrative user may access the I/O device 170 to enter information (e.g., via a keyboard, mouse, or other input device) and view outputs (e.g., via a screen, display or other display device). In some aspects, the I/O device 170 may be a combined device, such as a tablet, mobile phone or other device having a capacitive touchscreen.

The client computing system 104 may include a processor 150, a NIC 152, a memory 154 an I/O device 162. The processor 150 may include any number of processors and/or processor types, such as central processing units (CPUs), graphics processing units (GPUs), and others, configured to execute software instructions stored in the memory 154. In general, the processor 150 may include the features and functionalities of the processor 110 of the quality management system 102. The processor 150 may execute instructions stored in the memory 154. The memory NIC 152 may include the features and functionalities of the NIC 112 of the quality management system 102. The memory 154 may include the features and functionalities of the memory 120. For example, the memory 154 may include RAM, ROM, magnetic storage, solid state storage and sets of executable instructions (i.e., software) stored in a plurality of modules. Specifically, the memory 154 may include a user interface module 156, a data processing module 158, and a communication module 160.

The user interface module 156 may include instructions for generating and managing graphical user interfaces (GUIs) through which users can interact with the client computing system 104. This module may allow for the input of data, such as new requirements or specifications, and the display of information, such as reports or dashboards, to the user. For instance, the user interface module 156 may enable users to visually navigate through the object-oriented data model, facilitating the identification and modification of specific objects within the model.

The data processing module 158 may be responsible for executing various computational tasks within the client computing system 104. This module may process input data received through the user interface module 156, applying business logic or other processing rules to this data. The data processing module 158 may also interact with the memory 154 to store or retrieve data, ensuring that the client computing system's operations are based on the most current and accurate information. For example, the data processing module 158 may analyze input data to identify potential impacts on the validated system, suggesting modifications or updates to maintain compliance with regulatory standards.

The communication module 160 may facilitate communication between the client computing system 104 and other components of the computing environment 100, such as the quality management system 102 and the one or more remote systems 106. This module may use the NIC 152 to establish and maintain network connections, enabling the exchange of data across the electronic network 108. The communication module 160 may support various communication protocols and standards, ensuring compatibility and secure data transmission between systems. For instance, the communication module 160 may transmit updates from the client computing system 104 to the quality management system 102, ensuring that changes made by users are reflected across the computing environment 100.

The I/O device 162 may include one or more peripheral devices (e.g., a mouse, a keyboard, etc.), one or more displays (e.g., monitors or screens), and/or one or more combined I/O devices (e.g., a capacitive touchscreen). The I/O device 170 may be configured to receive input from a user and to provide output to the user. This configuration allows for interaction between the user and the client computing system 104, facilitating the execution of various tasks and operations within the system. For example, an administrative user may access the I/O device 170 to enter information (e.g., via a keyboard, mouse, or other input device) and view outputs (e.g., via a screen, display or other display device). In some aspects, the I/O device 170 may be a combined device, such as a tablet, mobile phone or other device having a capacitive touchscreen.

The remote computing systems may include remote computing system 106-1, 106-2 through 106-*n* where n is a positive integer. The remote computing systems 106 may correspond to services accessed by the quality management system 102. For example, The remote computing systems 106 may serve as sources of data and functionality that are external to the quality management system 102 and the client computing system 104, contributing to the comprehensive management of quality procedures and change management within the computing environment 100. Each remote computing system 106 may be specialized to provide specific types of data or services that are integral to the operation of the validated system. For instance, a remote computing system 106 may be a regulatory database that provides up-to-date information on regulatory standards and requirements, a project management tool like Jira that tracks the progress of software development tasks, or a code repository like GitHub that hosts the source code of the validated system.

The remote computing systems 106 may be capable of sending notifications or data updates to the quality management system 102 through the electronic network 108, using the NIC 112 for communication. These updates may include changes to regulatory requirements, modifications to project tasks, or new versions of source code, among others. The data received from the remote computing systems 106 may then be processed by the data integration module 122, which integrates this data into the object-oriented data model maintained by the quality management system 102.

Further, the remote computing systems 106 may receive data or commands from the quality management system 102 or the client computing system 104. For example, the quality management system 102 may transmit updated compliance information to a regulatory database, or the client computing system 104 may push a new version of the source code to a code repository. This bi-directional communication capability enables the computing environment 100 to maintain synchronization between the internal object-oriented data model and the external data sources and services, ensuring that the validated system is always aligned with the latest requirements and standards.

Additionally, the remote computing systems 106 may support various communication protocols and standards to ensure secure and efficient data transmission. They may also provide APIs that allow the quality management system 102 to interact with them programmatically, facilitating automation and integration within the computing environment 100. This level of integration is crucial for enabling dynamic updates and changes to the validated system, allowing it to adapt quickly to new regulations, findings, or development needs without compromising compliance or quality.

The electronic database 180 may be implemented as a centralized repository for storing and managing the object-oriented data model and its associated objects. The electronic database 180 may be implemented using various technologies. For instance, a relational database management system (RDBMS) like PostgreSQL or MySQL could be utilized, with tables designed to store objects and their attributes while maintaining relationships through foreign keys. Alternatively, a NoSQL database such as MongoDB or Redis may be used, in some aspects, to store complex, nested objects. Additionally, graph databases like Neo4j could be employed to efficiently represent and query the relationships between objects within the data model, which is particularly useful for tracing dependencies and impacts across the system. Furthermore, the database 180 may leverage technologies such as in-memory data storage for faster data retrieval and processing, ensuring that the quality management system 102 can access and manipulate data with minimal latency.

The network 108 may be a single communication network or may include multiple communication networks of one or more types, such as one or more wired and/or wireless local area networks (LANs), and/or one or more wired and/or wireless wide area networks (WANs) such as the Internet. The network 108 connects the quality management system 102 to other components associated with the validated system (e.g., the client computing system 104 and/or the one or more remote systems 106), facilitating the integration and synchronization of data.

It should be appreciated that the computing environment 100, as described, may be implemented partially or entirely within a cloud computing environment, leveraging the scalability, flexibility, and efficiency that cloud platforms offer. Cloud computing environments provide virtualized computing resources over the internet, allowing for dynamic scaling and management of applications and data. There are several types of cloud hosting platforms that could be utilized for implementing the computing environment 100, each offering distinct advantages depending on the specific needs of the system. For example, public cloud platforms, such as Amazon Web Services (AWS), Microsoft Azure, and Google Cloud Platform (GCP), offer a wide range of services and infrastructure that can be rented on a pay-as-you-go basis. The computing environment 100 could be deployed on a public cloud to take advantage of its massive scale, robust security measures, and comprehensive suite of services. For example, the quality management system 102 could be hosted on virtual servers, utilizing cloud-based databases like Amazon RDS or Azure SQL Database for the electronic database 180, and leveraging cloud storage services for efficient data management.

A private cloud offers a dedicated infrastructure for a single organization, providing greater control and customization of the computing resources. Private cloud solutions, such as VMware's vCloud Suite or OpenStack, could be used to implement the computing environment 100 within an organization's data center, ensuring that sensitive data remains within the corporate firewall. This approach might be preferred when servicing highly regulated industries where data privacy and compliance are paramount.

Hybrid cloud environments combine public and private cloud elements, allowing data and applications to move between the two environments. This model may be used to implement the computing environment 100 in some aspects, thereby enabling sensitive components, such as the regulatory compliance tracking module 134, to be hosted on a private cloud, while less sensitive components could leverage the scalability of a public cloud. Hybrid cloud solutions like Microsoft Azure Stack or AWS Outposts could facilitate this integration.

In any of these cloud computing environments, the computing environment 100 may utilize containerization technologies like Docker and orchestration tools such as Kubernetes to manage the deployment and scaling of the various modules, including the data integration module 122, the parsing module 124, and the AI analysis module 138. Cloud-based continuous integration and continuous deployment (CI/CD) pipelines may automate the testing and deployment of updates to the system, ensuring that the computing environment remains agile and can quickly adapt to new regulatory requirements or system enhancements.

The electronic network 108 enables bidirectional communication between the quality management system 102 and other components of the computing environment 100 (e.g., the client computing system 104 and the one or more remote systems 106).

Exemplary Computer-Implemented Methods

Figure 2:
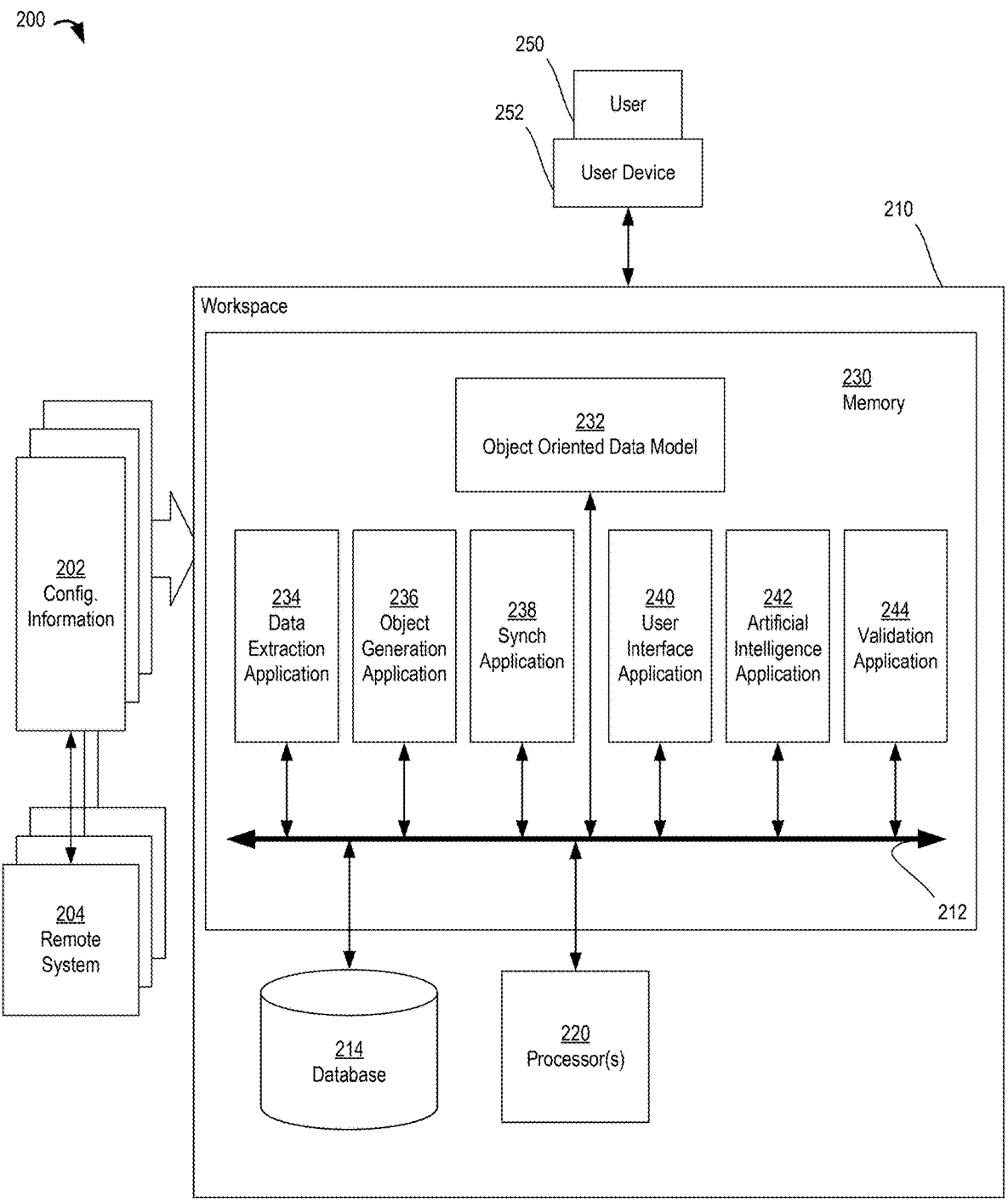
FIG. 2 depicts a high-level block/flow diagram showing an exemplary system/method 200 for the computational enforcement of quality procedures of a validated system, integrating data from a plurality of remote systems into an object-oriented data model to manage quality procedures and change management in the development and release of the validated system, according to some aspects.

FIG. 2 depicts a high-level block/flow diagram showing an exemplary system/method 200 for the computational enforcement of quality procedures of a validated system, integrating data from a plurality of remote systems into an object-oriented data model to manage quality procedures and change management in the development and release of the validated system, according to some aspects. The system/method 200 includes a configuration information module 202, a remote system 204, a data extraction application 234, an object generation application 236, a synchronization application 238, a user interface application 240, an artificial intelligence application 242, a validation application 244, an object-oriented data model 232, a database 214, and processors 220, all of which are interconnected and interact with a memory 230 to facilitate the computational enforcement of quality procedures.

The configuration information module 202 may provide initial setup and configuration data necessary for the system/method 200 to operate according to predefined parameters. This module may be capable of receiving and processing input from a variety of sources to customize the system's behavior and performing further actions. For example, the configuration information module 202 may receive information related to requirements, specifications, tests, risks, anomalies, complaints, change requests, corrective and preventive actions (CAPAs), dependencies, etc. In the context of regulation, CAPA refers to the process used by companies, e.g., in the pharmaceutical, medical device, and food industries, to identify, investigate, and correct nonconformities or defects in their products and processes. Additionally, CAPA may involve implementing actions that prevent the recurrence of these issues. This system may be mandated by regulators (e.g., the FDA) to ensure that companies maintain continuous quality improvement, thereby safeguarding public health by ensuring that products are safe and effective. Thus, the configuration module 202 may ingest information (e.g., a document describing CAPA with respect to a company, a product, a process, etc.) to enable this information to be codified and referenced by the system/method 200.

The remote system 204 may be capable of interacting with the system/method 200 to provide external data or services. This interaction may be facilitated through network connections, allowing for the exchange of information that is relevant to the enforcement of quality procedures.

The data extraction application 234 may be responsible for retrieving data from various sources, including the remote system 204. This application may be capable of processing and filtering the data to extract relevant information for use within the system.

The object generation application 236 may utilize the extracted data to create or update objects within the object-oriented data model 232. This application may be capable of interpreting the data to determine how it should be represented within the model.

The synchronization application 238 may monitor changes in the remote system 204 and update the object-oriented data model 232 accordingly. This application may be capable of ensuring that the model remains consistent with the external data sources.

The user interface application 240 may provide a means for users to interact with the system/method 200. This application may be capable of displaying information from the object-oriented data model 232 and receiving input from users.

The artificial intelligence application 242 may analyze the data within the object-oriented data model 232 to identify patterns, make predictions, or suggest actions. This application may leverage machine learning algorithms to improve its effectiveness over time.

The validation application 244 may be responsible for ensuring that the data and processes within the system/method 200 meet certain quality standards. This application may be capable of performing checks and enforcing rules defined within the system.

The object-oriented data model 232 serves as the central repository of information within the system/method 200. It may be designed to represent the data in a structured manner that facilitates processing and analysis.

The database 214 may provide persistent storage for the data used and generated by the system/method 200. This storage may be necessary for maintaining the state of the object-oriented data model 232 over time.

The processors 220 may execute the instructions of the various applications within the system/method 200. These processors may be capable of handling multiple tasks simultaneously and may interact closely with the memory 230 to access and manipulate data.

The memory 230 may store the instructions and data needed by the processors 220 to perform their functions. This memory may be used to temporarily hold information that is being processed or transferred within the system.

The elements 200-230 in the system/method for the computational enforcement of quality procedures, as described in the block/flow diagram of FIG. 2, may correspond to the components of the computing environment 100 depicted in FIG. 1. For example, the Configuration Information Module 202 may correspond to the combination of the quality management system 102, client computing system 104, and one or more remote systems 106 in FIG. 1. It may be responsible for providing the initial setup and configuration data necessary for the computing environment 100 to operate according to predefined parameters. The Remote System 204 may correspond to the one or more remote systems 106 in FIG. 1. These systems may be external entities that interact with the computing environment 100 to provide data or services relevant to the enforcement of quality procedures. The Data Extraction Application 234 may be part of the functionality provided by the data integration module 122 within the memory 120 of FIG. 1. It is responsible for retrieving and processing data from various sources, including remote systems 106. The Object Generation Application 236 may correspond to the functionalities of the mapping module 126 within the memory 120 in FIG. 1. This application may use extracted data to create or update objects within the object-oriented data model. The Synchronization Application 238 may correspond to the synchronization module 128 within the memory 120 of FIG. 1. It ensures that the object-oriented data model remains consistent with external data sources by monitoring and updating changes. The User Interface Application 240 may be facilitated by the client computing system 104 in FIG. 1, providing a means for users to interact with the computing environment 100. The Artificial Intelligence Application 242 may correspond to the AI analysis module 138 within the memory 120 of FIG. 1. The artificial intelligence application 242 may analyze data within the object-oriented data model to identify patterns, make predictions, or suggest actions. The Validation Application 244 may correspond to the regulatory compliance tracking module 134 and the safety and cybersecurity management module 136 within the memory 120 of FIG. 1, ensuring data and processes meet quality standards. The Object-Oriented Data Model 232 may represents the structured representation of data within the computing environment 100, closely related to the functionalities provided by the memory 120 and its modules in FIG. 1. The Database 214 may correspond to the electronic database 180 in FIG. 1, providing persistent storage for data used and generated by the computing environment 100. The Processors 220 may correspond to the processor 110 in FIG. 1, executing instructions of various applications and handling multiple tasks simultaneously. The Memory 230 may correspond to the memory 120 in FIG. 1, storing instructions and data needed by processors to perform their functions within the computing environment 100.

Figure 3:
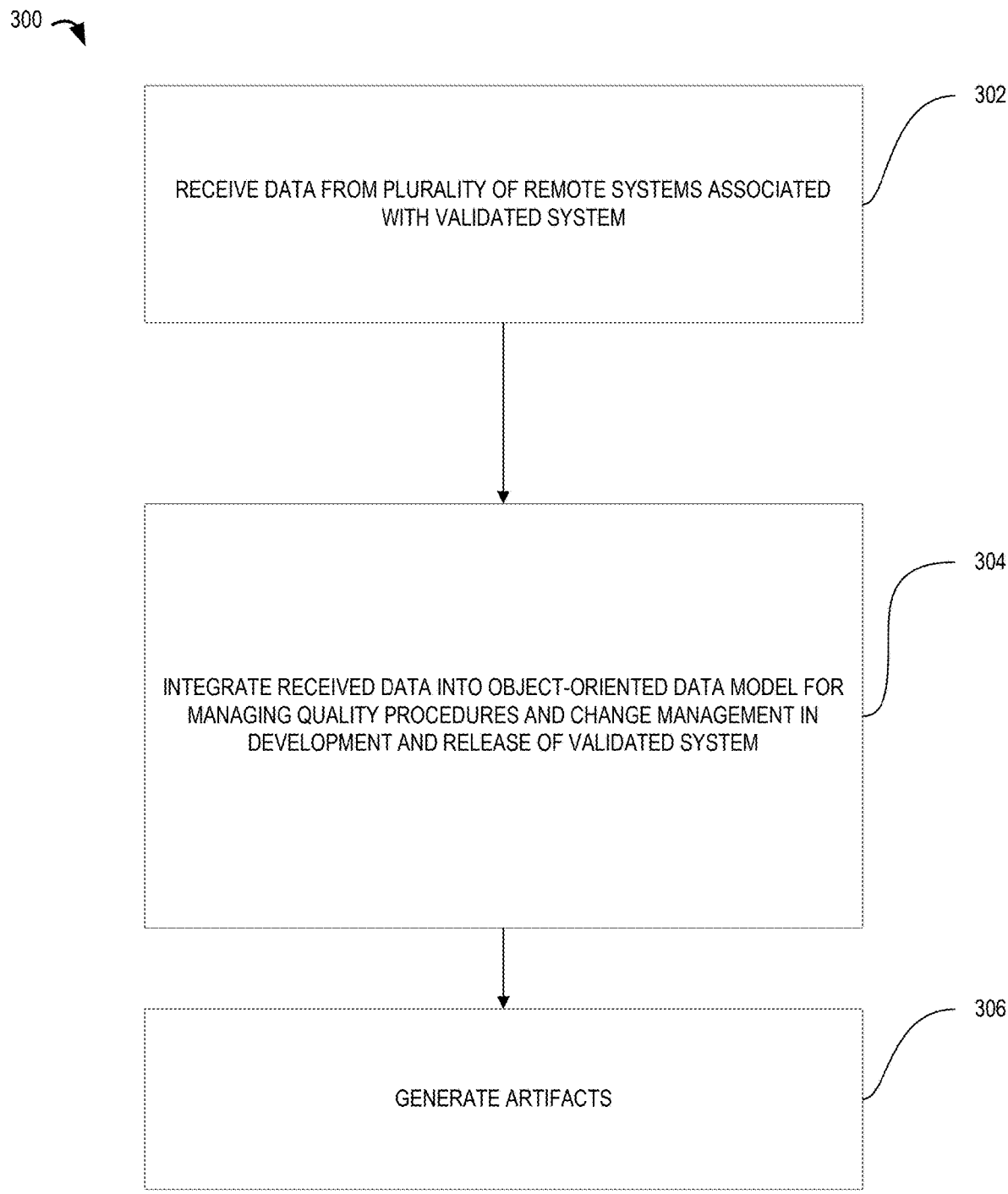
FIG. 3 depicts a computer-implemented method 300 for computational enforcement of quality procedures of a validated system according to some aspects.

FIG. 3 depicts a computer-implemented method 300 for computational enforcement of quality procedures of a validated system according to some aspects. The method 300 may be configured to integrate and manage data from various sources to ensure the quality and compliance of systems such as medical devices, pharmaceutical products, and other regulated systems. The method 300 may create and modify one or more object-oriented data models to streamline the development, testing, and release processes while ensuring regulatory compliance and facilitating change management.

The method 300 may include receiving data from a plurality of remote systems associated with the validated system (block 302). This data may encompass configuration information related to requirements, specifications, tests, risks, or dependencies of the validated system. The data can be sourced from diverse systems, each contributing unique insights into the validated system's configuration and operational parameters.

The method 300 may include integrating the received data into an object-oriented data model (block 304). This integration process involves parsing the received data using a plurality of parsers, each tailored to a specific remote system. The parsed data is then mapped to corresponding items within the object-oriented data model. This model serves as a centralized repository for managing quality procedures and change management, facilitating a cohesive view of the validated system's development and release processes.

The method 300 may include synchronizing changes between the plurality of remote systems and the object-oriented data model. By monitoring the remote systems for changes, the method ensures that the data model remains up-to-date and reflects the current state of the validated system. This synchronization process enables the system to maintain integrity of the data model and ensuring that all stakeholders have access to the latest information. At the code level, the synchronization of changes between the plurality of remote systems and the object-oriented data model may be a multifaceted process that involves several interconnected steps. Initially, the system may establish a mechanism to detect changes in the remote systems (e.g., via direct notifications from those systems or by periodically querying them to identify any updates).

Upon identifying changes in a remote system, the method 300 may include retrieving the updated data. This step may involve making one or more API calls to the remote systems (e.g., the one or more remote systems 106), which may include handling authentication and authorization protocols specific to each system, as well as managing potential issues such as rate limiting or network errors. The retrieved data, which may be in various formats depending on the remote system, may then be parsed to transform it into a structure that is compatible with the local object-oriented data model.

Following the parsing and transformation of the data, the method 300 may update the object-oriented data model to reflect the changes. This may include creating new instances within the model or updating existing instances with the new data. The process of integrating the data into the model may leverage Object-Relational Mapping (ORM) tools to facilitate the interaction with the database, ensuring that the data model and the database are consistently synchronized. The synchronization process may include conflict resolution, as changes from multiple remote systems may result in discrepancies or conflicts within the data model. The method 300 may include applying predefined rules to resolve these conflicts, for example, by prioritizing data from certain sources or merging changes based on specific criteria such as timestamps. Once the data model has been updated, the method 300 may include notifying one or more stakeholders of the changes and log the synchronization process for auditing and troubleshooting purposes.

The method 300 may include generating one or more artifacts based on the integration, synchronization, and tracking of data within the object-oriented data model (block 306). These artifacts may be automatically generated and can be used for various purposes, including regulatory approval, documentation, and quality assurance.

The method 300 may include receiving changed data, capturing a snapshot of the changed data, and creating a new item within the object-oriented data model to document the change. This process ensures that all changes are accurately recorded and traceable, facilitating compliance with regulatory standards and enabling efficient change management. In the context of the method 300, the term "artifacts" refers to a variety of outputs or products that are generated as a result of the integration, synchronization, and tracking of data within the object-oriented data model. These artifacts are created through automated processes and serve multiple purposes across different stages of system development, regulatory compliance, and quality management.

Artifacts may include, but are not limited to, detailed reports that summarize the current state of the system, including any changes that have been synchronized from remote systems. These reports can provide valuable insights into the system's configuration, operational parameters, and compliance status with relevant standards and regulations. They may be used internally for decision-making or externally to demonstrate compliance to regulatory bodies. Another form of artifact may be documentation that describes the system's design, functionality, and operational procedures. This documentation may assist with reasoning about the system's behavior for training new users or developers. It can also be used during audits, where clear and comprehensive documentation of processes and procedures is often required. Quality assurance test results and logs may also be considered artifacts. These are generated from the execution of tests designed to verify that the system meets specified requirements and standards. Test results can highlight areas of the system that are performing as expected, as well as identify potential issues that need to be addressed. Logs provide a detailed record of test executions, outcomes, and any actions taken in response to test findings.

Change logs and traceability matrices are additional examples of artifacts. Change logs record all modifications made to the system, including details about what was changed, when, and by whom. This information may be used for tracking the evolution of the system over time and for auditing purposes. Traceability matrices, on the other hand, map requirements to their corresponding tests and outcomes, ensuring that all system requirements are adequately tested and validated. This is particularly important for regulatory compliance and quality assurance, as it demonstrates that the system has been thoroughly evaluated and meets all necessary standards.

The method 300 may include tracking relationships between items within the object-oriented data model to enforce regulatory compliance and quality assurance. This tracking process ensures that each requirement is covered by at least one test and that approvals for changes are documented according to predetermined regulatory standards. By maintaining a comprehensive traceability matrix, the method supports rigorous quality assurance practices and regulatory compliance. For example, at the code level, tracking relationships between items within the object-oriented data model to enforce regulatory compliance and quality assurance may include several steps. Initially, the data model may be designed to include entities or classes representing the various items, such as requirements, tests, and approvals. Each of these entities has attributes that define its properties and relationships with other entities. For example, a "Requirement" entity might have relationships to one or more "Test" entities to ensure that each requirement is covered by at least one test. To implement the tracking of these relationships, the code may include functions or methods to create, update, and query these relationships. For instance, when a new requirement is added to the system, a method is called to link this requirement with corresponding tests. This may involve creating entries in a relational database table that associates requirement IDs with test IDs, effectively creating a many-to-many relationship between requirements and tests. For documenting approvals for changes, the data model may include an "Approval" entity, which is linked to the items being approved (e.g., changes to requirements or tests). The code may ensure that each change has an associated approval by enforcing constraints at the database level or through application logic, preventing the finalization of changes without the necessary approvals. The comprehensive traceability matrix is essentially a dynamic report generated by querying the underlying database. It retrieves and displays the relationships between requirements, tests, and approvals in a structured format. This might involve complex SQL queries or the use of an Object-Relational Mapping (ORM) tool to abstract and simplify the database interactions. The code would dynamically generate this matrix based on the current state of the data model, ensuring that it reflects the latest information. Additionally, to support rigorous quality assurance practices and regulatory compliance, the system might include validation logic to check the completeness and integrity of the relationships. For example, before a product release, the code could automatically verify that all requirements have associated tests and that all changes have been approved according to the predetermined regulatory standards.

The method 300 may include managing safety and cybersecurity requirements for the validated system. By utilizing the integrated data within the object-oriented data model, potential risks can be identified and mitigated. This management process includes generating tests for specific risk controls and validating the system against safety and security standards, ensuring that the validated system meets all necessary safety and cybersecurity requirements.

The method 300 may include leveraging artificial intelligence to analyze items within the object-oriented data model. This analysis may include generating suggestions for tests based on identified risk controls, identifying requirements without corresponding tests, and providing an overview of system activities to facilitate decision-making. The artificial intelligence component enhances the method's ability to manage quality procedures and change management effectively.

At the code level, leveraging artificial intelligence (AI) to analyze items within the object-oriented data model may include integrating AI algorithms or models with the computing environment 100's existing infrastructure. This integration allows the AI component to access and interpret the data stored within the object-oriented data model, perform analyses, and generate insights or recommendations based on the data.

The method 300 may include applying machine learning or data analysis techniques. For example, to generate suggestions for tests based on identified risk controls, the AI component might use natural language processing (NLP) algorithms to analyze the descriptions of risk controls and identify key concepts or requirements. Based on this analysis, the AI could then search the data model for existing tests that cover similar concepts or suggest new tests that need to be created to address uncovered risks.

Identifying requirements without corresponding tests involves querying the data model for requirements and then checking for associated tests. The AI component may use pattern recognition or other analytical methods to identify requirements that lack sufficient testing coverage. This analysis may involve comparing the attributes of requirements and tests, such as their associated risk levels or functional areas, to determine whether the testing coverage is adequate.

Providing an overview of system activities to facilitate decision-making may involve aggregating and summarizing data from the object-oriented data model. The AI component may use statistical analysis or data visualization techniques to highlight trends, identify anomalies, or predict future states based on historical data. This may help stakeholders understand the current status of the system, assess the effectiveness of quality procedures, and make informed decisions about future actions.

To enhance the method's ability to manage quality procedures and change management effectively, the AI component may also implement feedback mechanisms. For instance, the method 300 may include teaching one or more machine learning models to learn from past decisions or outcomes to refine its algorithms and improve the accuracy of its suggestions over time.

The method 300 may include authenticating electronic signatures associated with changes to the configuration items within the object-oriented data model. This authentication process complies with regulatory requirements for electronic signatures, ensuring that each change is verified and authorized according to predetermined regulatory standards.

The method 300 may include enforcing an approval system that controls the transition of items within the object-oriented data model to predetermined states based on received approvals. This approval system defines rules for required approvals from designated individuals for specific item changes and propagates these approvals to external systems. This ensures that items cannot transition to certain states without the requisite approvals being documented and synchronized across the integrated systems.

The method 300 may include managing a variety of data types within the object-oriented data model, including clinical data, real-world evidence, real-world data, and AI technology. This management involves integrating, tracking, and documenting the data to support regulatory submissions, clinical trials, patient outcome studies, post-market surveillance activities, and the lifecycle management of AI models.

The present techniques offer a number of improvements over conventional techniques. The method 300 offers a solution for medical device software teams aiming to integrate artificial intelligence (AI) and machine learning (ML) into their products while adhering to regulatory standards. By simplifying change management and accelerating development, it addresses the main hurdles that teams face in releasing updates more frequently. The system's foundation in FDA-grade AI compliance ensures that medical device software not only meets but exceeds the stringent requirements set forth by regulatory bodies. One of the key benefits of the system is its ability to enable faster releases without compromising compliance. This is particularly crucial for teams working with AI/ML in medical devices, as the technology landscape evolves rapidly. The system supports the use of advanced AI and ML models, which can significantly enhance the accuracy and reliability of medical devices. This improvement is critical in a field where precision and dependability can directly impact patient outcomes. Moreover, the system provides a clear pathway for integrating AI/ML models into existing software systems and design controls. This integration is facilitated by the recent PCCP guidance, which offers more flexibility in the development and deployment of AI/ML in medical devices. Developers can leverage open-source AI/ML packages and scale their machine learning models to meet real-world demands, thus fostering innovation and efficiency. Another significant advantage is the system's robust enforcement and risk management capabilities. It ensures that machine learning models remain compliant with FDA and MDR regulatory requirements and standards throughout their lifecycle. This compliance is achieved through built-in release gates, which validate the model before every release, and a specification approval process that transforms data into actionable specifications. Additionally, the system enforces best practices in coding, version control, and collaborative development, further enhancing the quality and reliability of the software. The system also emphasizes the importance of traceability and AI governance, ensuring the ethical, responsible, and effective development and deployment of machine learning models. This focus on governance and traceability not only aids in maintaining compliance but also builds trust with end-users and regulatory bodies.

Still further, the present techniques offer a transformative approach for developers and quality teams working on Software as a Medical Device (SaMD) and connected devices, significantly reducing the complexity, time, and cost associated with building FDA-compliant applications. By positioning itself as a developer-first connected lifecycle management platform, it caters directly to the needs of modern software development within the medical device sector, where the landscape is rapidly evolving and becoming increasingly complex. One of the standout benefits of the system is its ability to streamline the development process for SaMD applications. Traditional methods of software development often fall short in meeting the demands of today's software requirements, especially in safety-critical environments. The system bridges this gap by integrating modern software development methodologies with the stringent documentation and compliance requirements necessary for patient safety and regulatory approval. This integration not only accelerates the release of SaMD applications but also ensures they are safe and reliable. Furthermore, the system enhances productivity and control through its built-in compliance features. By integrating with popular development tools like Jira and GitHub, it transforms these platforms into a self-documenting, self-enforcing, and self-tracing ecosystem. This ecosystem simplifies the compliance process, making it more manageable and less time-consuming for development teams. The result is a more efficient development lifecycle that maintains the highest standards of quality and compliance. Traceability is another critical aspect of the system, ensuring digital knowledge continuity throughout the development process. The system's self-tracing compliance software allows teams to establish traceability early in the development cycle, making it easier to understand and categorize each component of the system. This feature not only keeps team members updated with the latest data but also simplifies the onboarding and training of new team members. By lowering the barrier to entry for understanding and implementing compliance requirements, the system fosters a more inclusive and productive development environment. In addition to traceability, the system addresses other key areas such as cybersecurity, enforcement, risk management, and postmarket surveillance. These features collectively contribute to a comprehensive solution that supports the entire lifecycle of SaMD development, from initial design to postmarket activities.

Furthermore, in some aspects, the environment 100 revolutionizes the way medical device development teams use Jira, transforming it into a platform that not only supports but enhances compliance with IEC 62304 standards. By addressing the inherent limitations of Jira in regulated development environments, such as maintaining immutable records, enforcing total product life cycle control, validating the non-product software toolchain, and ensuring traceability and visibility across systems, the system offers a seamless integration of compliance into the everyday tools developers love. One of the primary benefits of the environment 100 in this respect is its ability to maintain end-to-end traceability across the total product lifecycle directly within Jira. This feature allows teams to track every change from user requirements to specifications to tests, ensuring that every aspect of the product's development is accounted for and visible. The traceability widget embedded in Jira provides an easy view of dependencies and relationships, enhancing the understanding and management of the product development process. Moreover, the system enforces standard operating procedures within Jira, ensuring that developers' work remains compliant with IEC 62304 requirements. It introduces gate releases and approvals that align with quality processes, preventing uncontrolled requirements or unapproved test cases from progressing. This enforcement mechanism ensures that once items are approved, they become immutable, thereby preventing any deviation from the established process. Another significant advantage is the integration of Part 11-compliant electronic signatures within Jira. This feature allows for secure and legally binding approvals directly within the platform, meeting 21 CFR Part 11 requirements. It ensures that all electronic records are authenticated, authorized, and tamper-proof, making the system audit-ready at any moment. In some aspects, the system also automates the generation of compliant documentation from the work done in Jira. This automation of evidence collection and documentation creation eliminates the need for tedious software development documentation processes. Automatically generated documents are structured to meet IEC 62304 requirements, ensuring that the development team is always prepared for audits. Risk management may be integrated into the Jira platform, enabling teams to proactively identify and mitigate risks throughout the development process. This integration allows for continuous tracking and evaluation of risks, with risk mitigation strategies embedded into every stage of development.

Moreover, the present techniques enable achieving IEC 62304-compliant traceability for automated tests, significantly enhancing the safety and speed of software development. By bridging the gap between automated tests stored in code repositories such as Git and test plans in project management tools such as Jira, it eliminates the need for developers to document automated test cases to ensure traceability. This integration enables developers to utilize Git in the most efficient way possible, leveraging the full potential of automated tests to accelerate the release process while automatically generating compliant documentation. One of the key benefits of the system is its ability to automatically trace automated tests in Git to requirements in Jira. This feature ensures that everything from automated test cases to the corresponding requirements or change requests is seamlessly connected, reducing the risk of human error and ensuring more consistent results. The automation of test documentation not only speeds up the development process but also contributes to the creation of safer software by establishing a clear and compliant traceability path. Moreover, the present techniques enhance compliance and speed up the release process by continuously monitoring software dependencies for vulnerabilities, in some aspects. This proactive approach prevents the release of software with unapproved dependencies, maintaining the security and compliance of the software at all times. Before a product version can be released, the system verifies that all requirements and other configuration items are adequately traced to tests and show satisfactory results, thereby increasing product quality and compliance. The system also features built-in safeguards that ensure tests are executed and documented correctly. These safeguards are integral to maintaining the integrity of the development process, ensuring that every step, from testing to documentation, adheres to the highest standards of quality and compliance. Integration with preferred DevTools is another significant advantage, offering seamless integration with automated testing tools in the Continuous Integration/Continuous Deployment (CI/CD) pipeline. This integration facilitates the adoption of Agile methodologies for continuous improvement, allowing for the efficient reporting of automated build results to the system through an API or GitHub action. The ability to establish traceability between configuration items in Jira and corresponding automated tests further streamlines the development process, making it easier for teams to develop fast while staying compliant.

Further, the present techniques improve medical device development by emphasizing component reuse and adopting a system of systems architecture. This methodology significantly accelerates development processes, reduces costs, and ensures faster market entry for medical devices. By enabling the reuse of validated components and managing them independently, the system addresses the inefficiencies associated with the traditional development of medical software, where teams often find themselves rebuilding the same elements, tracking changes, and generating documentation from scratch. This not only delays the time to market but also escalates costs unnecessarily. A key benefit of the present techniques is the ability to reduce complexity and accelerate release cycles through a modular approach. By breaking down monolithic architectures into modular, reusable systems, such as microservices, the system facilitates faster development with fewer defects. This modularization not only simplifies the development process but also enhances the maintainability and scalability of medical software, allowing teams to adapt more quickly to changes in requirements or regulations. The system of systems architecture supported by the system ensures that regulated software teams can reuse components while managing their versions independently. This independence is crucial for maintaining the integrity of each component and ensuring that updates or changes to one component do not inadvertently affect the functionality of others. This architecture significantly streamlines the development process, making it easier for teams to implement updates, fix bugs, and add new features without risking the stability of the entire system. As noted, the system establishes end-to-end traceability, a critical requirement for regulatory compliance. It ensures that every change, across multiple versions of a system or various subsystems, is documented and traceable. This traceability is vital for meeting regulatory requirements without resorting to software development tracking, thereby saving time and reducing the risk of errors. The requirements traceability matrix provided by the system offers full visibility of all components, maintaining trace relationships between various subsystems and ensuring that every aspect of the development process is accounted for and compliant.

Further, the present techniques offer a solution for building GxP-compliant computer systems for SaaS and AI applications, significantly reducing the complexity, time, and cost associated with developing GAMP 5 validated applications. By automating the generation of user requirements, testing plans, and reports directly from systems of work, it streamlines the documentation process, allowing developers to concentrate on innovating and enhancing the impact of their AI/ML-enabled products. A major advantage of the system is its ability to increase developer productivity while reducing quality overhead. By integrating common development tools like Jira or GitHub into a single traceable Software Development Lifecycle (SDLC), the system accelerates the speed of development and streamlines Part 11 compliance across IT systems. This integration ensures that everything from requirements to test cases is managed in one place, minimizing developer friction and eliminating waste through embedded risk analysis. The system's capabilities extend to automatic evidence generation, providing a seamless way to produce Part 11-compliant evidence directly from development tools. This feature not only automates the generation of all FDA-required evidence with a single click but also ensures that all work history is automatically generated, stored, retrievable, and immutable, making the evidence audit-ready at all times. Continuous system visibility is another critical benefit, connecting disparate IT systems into a single validated SDLC. This connectivity ensures that all configuration items, software dependencies, and cloud services are validated, up to date, and approved, maintaining compliance with 21 CFR Part 11, ISO 13485, ISO 9001, GAMP5, and other relevant FDA guidances. Furthermore, the system offers automatic process control, featuring guided change control and the automatic generation of all design control documents, testing reports, and other required artifacts. The compliant-by-design workflows ensure that the development process adheres to regulatory standards without compromising on speed or innovation. Support for microservice architecture is also a key feature, allowing services to be separated into their own projects and cross-traced between them. This support enables versioning of services at different cadences while maintaining design control, and aggregates different services into a single set of design controls automatically.

The present techniques advantageously accelerate medical software development by leveraging automated enforcement to remove common barriers associated with quality and compliance. Traditionally, software developers in regulated industries have been bogged down by software development processes, including adhering to Quality Management System (QMS) procedures, which significantly slow down workflows. The automated enforcement of the environment 100 (i.e., engineering controls) infuse quality and compliance into every stage of the total product life cycle, enabling developers to work faster and more efficiently. Automated enforcement serves as a set of guardrails within development tools like Jira and GitHub, preventing process deviation and automatically generating the required documentation to prove compliance. This method of enforcement accelerates time to market, enhances collaboration, and decreases risk by ensuring that the right actions are always taken in the right order. The shift away from ad hoc software development implementation of QMS procedures to automated enforcement addresses the inefficiencies of a model that has historically relied on developers software development following complex Standard Operating Procedures (SOPs) and conducting software development checks to catch process deviations.

The benefits of automated enforcement guardrails are manifold. They assure compliance by embedding quality checks into the software development process, ensuring that all procedures are followed accurately and consistently. This minimizes human error and enhances the safety and reliability of medical devices. Furthermore, automated enforcement accelerates the overall development process, shortening release cycles from months or years to weeks, enabling companies to bring new devices to market much faster. Automated guardrails also increase innovation by freeing developers from repetitive, complex, and time-consuming tasks, allowing them to dedicate more time to coding and creative problem-solving. This not only retains top talent by reducing their compliance burden and improving job satisfaction but also enhances collaboration between quality and development teams. Developers expect to have guardrails in place that reduce friction and allow them to focus on their core areas of expertise, and getting immediate feedback from automated enforcement helps them stay in the zone.

The system's approach to enforcement for regulated software development is designed to alleviate the symptoms of slow, fragmented development, such as projects not being delivered on time or escalating project costs. By enforcing processes across the tools already in use and automatically generating evidence of compliance, the system reduces rework, speeds up product innovation, and lessens the cognitive load of developing complex systems. This approach prevents common issues such as untrained personnel approving items, creating orphaned requirements, and releasing software without up-to-date and approved design controls and evidence documents.

Exemplary Aspects

The various embodiments described above can be combined to provide further embodiments. All U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

Aspects of the techniques described in the present disclosure may include any of the following aspects, either alone or in combination:

1. A computer-implemented method for computational enforcement of quality procedures of a validated system, comprising: (a) receiving, via one or more processors, data from a plurality of remote systems associated with the validated system, wherein the data comprises information related to at least one of requirements, specifications, tests, risks, anomalies, complaints, change requests, corrective and preventive actions, dependencies, or other configuration items associated with the validated system; and (b) integrating, via the one or more processors, the received data into an object-oriented data model for managing quality procedures and change management in the development and release of the validated system, wherein the integration includes: (1) parsing the received data using a plurality of parsers each configured for a respective one of the plurality of remote systems; (2) mapping the parsed data to corresponding items within the object-oriented data model; and (3) synchronizing, via the one or more processors, changes between the plurality of remote systems and the object-oriented data model by monitoring the remote systems for changes; and (c) generating, via the one or more processors, one or more artifacts, wherein the artifacts are automatically generated based on the integration, synchronization, and tracking of data within the object-oriented data model.

2. The method of aspect 1, further comprising: receiving, via the one or more processors, changed data; capturing, via the one or more processors, a snapshot of the changed data; and creating, via the one or more processors, a new item within the object-oriented data model to document the change.

3. The method of any of aspects 1-2, further comprising: tracking, via the one or more processors, relationships between items within the object-oriented data model to enforce regulatory compliance and quality assurance, wherein the tracking includes ensuring that each requirement is covered by at least one test and documenting approvals for changes according to predetermined regulatory standards.

4. The method of any of aspects 1-3, further comprising: managing, via the one or more processors, safety and cybersecurity requirements for the validated system by utilizing the integrated data within the object-oriented data model to identify and mitigate potential risks, wherein the management includes generating tests for specific risk controls and validating the validated system against safety and security standards.

5. The method of any of aspects 1-4, further comprising: leveraging, by the computing system, artificial intelligence to analyze items within the object-oriented data model, wherein the analysis includes generating suggestions for tests based on identified risk controls, identifying requirements without corresponding tests, and providing an overview of system activities to facilitate decision-making.

6. The method of aspect 5, wherein the artificial intelligence comprises a language model configured to receive queries related to the management of quality procedures and change management, and to provide responses based on the data integrated into the object-oriented data model.

7. The method of any of aspects 1-6, where the one or more artifacts are used for regulatory approval by a regulator.

8. The method of any of aspects 1-7, further comprising: authenticating, via the one or more processors, electronic signatures associated with the changes to the configuration items within the object-oriented data model, wherein the authentication complies with regulatory requirements for electronic signatures, ensuring that each change is verified and authorized according to predetermined regulatory standards.

9. The method of any of aspects 1-8, further comprising: enforcing, via the one or more processors, an approval system that controls the transition of items within the object-oriented data model to predetermined states based on received approvals, wherein the approval system includes: (1) defining rules for required approvals from designated individuals for specific item changes, and (2) propagating these approvals to external systems, ensuring that items cannot transition to certain states without the requisite approvals being documented and synchronized across the integrated systems.

10. The method of any of aspects 1-9, wherein the quality system is at least one of (a) a medical device system, (b) a pharmaceutical product, (c) an automotive system, (d) an aerospace system, (e) a consumer electronics system; (f) an energy system; (g) a railroad system; (h) a defense system; or (i) another type of validated system.

11. The method of any of aspects 1-10, further comprising: managing, via the one or more processors, a variety of data types including clinical data, real-world evidence, real-world data, and AI technology within the object-oriented data model, wherein the management involves integrating, tracking, and documenting the data to support regulatory submissions, clinical trials, patient outcome studies, post-market surveillance activities, and the lifecycle management of AI models.

12. A computing system for computational enforcement of quality procedures of a validated system, comprising: one or more processors; and one or more memories, having stored thereon instructions that, when executed, cause the computing system to: receive data from a plurality of remote systems associated with the validated system, wherein the data comprises information related to at least one of requirements, specifications, tests, risks, anomalies, complaints, change requests, corrective and preventive actions, dependencies, or other configuration items associated with the validated system; integrate the received data into an object-oriented data model for managing quality procedures and change management in the development and release of the validated system, wherein the integration includes parsing the received data using a plurality of parsers each configured for a respective one of the plurality of remote systems, mapping the parsed data to corresponding items within the object-oriented data model, and synchronizing changes between the plurality of remote systems and the object-oriented data model by monitoring the remote systems for changes; and generate one or more artifacts, wherein the artifacts are automatically generated based on the integration, synchronization, and tracking of data within the object-oriented data model.

13. The computing system of aspect 12, the memories having stored thereon further instructions that, when executed, cause the computing system to: receive changed data; capture a snapshot of the changed data; and create a new item within the object-oriented data model to document the change.

14. The computing system of any of aspects 12-13, the memories having stored thereon further instructions that, when executed, cause the computing system to: track relationships between items within the object-oriented data model to enforce regulatory compliance and quality assurance, wherein the tracking includes ensuring that each requirement is covered by at least one test and documenting approvals for changes according to predetermined regulatory standards.

15. The computing system of any of aspects 12-14, the memories having stored thereon further instructions that, when executed, cause the computing system to: manage safety and cybersecurity requirements for the validated system by utilizing the integrated data within the object-oriented data model to identify and mitigate potential risks, wherein the management includes generating tests for specific risk controls and validating the validated system against safety and security standards.

16. The computing system of any of aspects 12-15, the memories having stored thereon further instructions that, when executed, cause the computing system to: leverage artificial intelligence to analyze items within the object-oriented data model, wherein the analysis includes generating suggestions for tests based on identified risk controls, identifying requirements without corresponding tests, and providing an overview of system activities to facilitate decision-making.

17. The computing system of aspect 16, wherein the artificial intelligence comprises a language model configured to receive queries related to the management of quality procedures and change management, and to provide responses based on the data integrated into the object-oriented data model.

18. The computing system of any of aspects 12-17, wherein the one or more artifacts are used for regulatory approval by a regulator.

19. The computing system of any of aspects 12-18, the memories having stored thereon further instructions that, when executed, cause the computing system to: authenticate electronic signatures associated with the changes to the configuration items within the object-oriented data model, wherein the authentication complies with regulatory requirements for electronic signatures, ensuring that each change is verified and authorized according to predetermined regulatory standards.

20. A non-transitory computer-readable medium having stored thereon instructions that, when executed, cause a computer to: receive data from a plurality of remote systems associated with the validated system, wherein the data comprises information related to at least one of requirements, specifications, tests, risks, anomalies, complaints, change requests, corrective and preventive actions, dependencies, or other configuration items associated with the validated system; integrate the received data into an object-oriented data model for managing quality procedures and change management in the development and release of the validated system, wherein the integration includes parsing the received data using a plurality of parsers each configured for a respective one of the plurality of remote systems, mapping the parsed data to corresponding items within the object-oriented data model, and synchronizing changes between the plurality of remote systems and the object-oriented data model by monitoring the remote systems for changes; and generate one or more artifacts, wherein the artifacts are automatically generated based on the integration, synchronization, and tracking of data within the object-oriented data model.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for computational enforcement of quality procedures of a validated system, comprising:
    (a) receiving, via one or more processors, data from a plurality of remote systems associated with the validated system,
    wherein the received data comprises information related to at least one of requirements, specifications, tests, risks, anomalies, complaints, change requests, corrective and preventive actions, dependencies, or other configuration items associated with the validated system;
    (b) integrating, via the one or more processors, the received data into an object-oriented data model for managing quality procedures and change management in a development and release of the validated system, wherein the integration includes:
        (1) parsing, via the one or more processors, the received data using a plurality of parsers each configured for a respective remote system of the plurality of remote systems:
        (2) mapping, via the one or more processors, the parsed data to corresponding items within the object-oriented data model; and
        (3) synchronizing, via the one or more processors, changes between the plurality of remote systems and the object-oriented data model by polling the plurality of remote systems through respective application programming interfaces to programmatically detect changes;
    (c) dynamically updating, via the one or more processors, the received data from the plurality of remote systems by interacting with the object-oriented data model to identify one or more discrepancies between expected relationships among objects within the object-oriented data model using an artificial intelligence model trained to identify one or more discrepancies between the objects within the object-oriented data model by determining whether each object within the object-oriented data model is properly associated with corresponding (i) tests, (ii) requirements, or (iii) specifications; and
    (d) generating, via the one or more processors, one or more artifacts, wherein the one or more artifacts are automatically generated based on the integration of the received data, the synchronization of the changes, and h updating of the received data from the plurality of remote systems.

2. The computer-implemented method of claim 1, further comprising:
    receiving, via the one or more processors, changed data;
    capturing, via the one or more processors, a snapshot of the changed data; and
    creating, via the one or more processors, a new item within the object-oriented data model to document the changed data.

3. The computer-implemented method of claim 1, further comprising:
    tracking, via the one or more processors, relationships between items within the object-oriented data model to enforce regulatory compliance and quality assurance,
    wherein the tracking includes ensuring that each requirement is covered by at least one test and documenting approvals for changes according to predetermined regulatory standards.

4. The computer-implemented method of claim 1, further comprising:
    managing, via the one or more processors, safety and cybersecurity requirements for the validated system by utilizing the integrated data within the object-oriented data model to identify and mitigate potential risks,
    wherein the management includes generating tests for specific risk controls and validating the validated system against safety and security standards.

5. The computer-implemented method of claim 1, further comprising:
    leveraging, by the one or more processors, artificial intelligence to analyze items within the object-oriented data model,
    wherein the analysis includes generating suggestions for tests based on identified risk controls, identifying requirements without corresponding tests, and providing an overview of system activities to facilitate decision-making.

6. The computer-implemented method of claim 5, wherein the artificial intelligence comprises a language model configured to receive queries related to management of quality procedures and change management, and to provide responses based on the received data integrated into the object-oriented data model.

7. The computer-implemented method of claim 1, wherein the one or more artifacts are used for regulatory approval by a regulator.

8. The computer-implemented method of claim 1, further comprising:
    authenticating, via the one or more processors, electronic signatures associated with changes to configuration items within the object-oriented data model,
    wherein the authentication complies with regulatory requirements for electronic signatures, ensuring that each change is verified and authorized according to predetermined regulatory standards.

9. The computer-implemented method of claim 1, further comprising:
    enforcing, via the one or more processors, an approval system that controls a transition of items within the object-oriented data model to predetermined states based on received approvals,
    wherein the approval system includes:
    (1) defining rules for required approvals from designated individuals for specific item changes, and
    (2) propagating the required approvals to external systems, ensuring that items cannot transition to certain states without requisite approvals being documented and synchronized across integrated systems.

10. The computer-implemented method of claim 1, wherein the validated system is at least one of:
(a) a medical device system,
(b) a pharmaceutical product,
(c) an automotive system,
(d) an aerospace system,
(e) a consumer electronics system,
(f) an energy system,
(g) a railroad system,
(h) a defense system, or
(i) another type of validated system.

11. The computer-implemented method of claim 1, further comprising:
managing, via the one or more processors, a variety of data types including clinical data, real-world evidence, real-world data, and artificial intelligence technology within the object-oriented data model,
wherein the management involves integrating, tracking, and documenting the variety of data types to support regulatory submissions, clinical trials, patient outcome studies, post-market surveillance activities, and a lifecycle management of artificial intelligence models.

12. A computing system for computational enforcement of quality procedures of a validated system, comprising:
one or more processors; and
one or more memories, having stored thereon instructions that, when executed by the computing system, cause the computing system to:
receive data from a plurality of remote systems associated with the validated system,
wherein the received data comprises information related to at least one of requirements, specifications, tests, risks, anomalies, complaints, change requests, corrective and preventive actions, dependencies, or other configuration items associated with the validated system;
integrate the received data into an object-oriented data model for managing quality procedures and change management in a development and release of the validated system,
wherein the integration includes parsing the received data using a plurality of parsers each configured for a respective remote system of the plurality of remote systems, mapping the parsed data to corresponding items within the object-oriented data model, and synchronizing changes between the plurality of remote systems and the object-oriented data model by polling the plurality of remote systems through respective application programming interfaces to programmatically detect changes;
dynamically update the received data from the plurality of remote systems by interacting with the object-oriented data model to identify one or more discrepancies between expected relationships among objects within the object-oriented data model using an artificial intelligence model trained to identify one or more discrepancies between the objects within the object-oriented data model by determining whether each object within the object-oriented data model is properly associated with corresponding (i) tests, (ii) requirements, or (iii) specifications; and
generate one or more artifacts, wherein the one or more artifacts are automatically generated based on the integration of the received data, the synchronization of the changes, and the updating of the received data from the plurality of remote systems.

13. The computing system of claim 12, the one or more memories, having stored thereon further instructions that, when executed by the computing system, cause the computing system to:
receive changed data;
capture a snapshot of the changed data; and
create a new item within the object-oriented data model to document the changed data.

14. The computing system of claim 12, the one or more memories, having stored thereon further instructions that, when executed by the computing system, cause the computing system to:
track relationships between items within the object-oriented data model to enforce regulatory compliance and quality assurance,
wherein the tracking includes ensuring that each requirement is covered by at least one test and documenting approvals for changes according to predetermined regulatory standards.

15. The computing system of claim 12, the one or more memories, having stored thereon further instructions that, when executed by the computing system, cause the computing system to:
manage safety and cybersecurity requirements for the validated system by utilizing the integrated data within the object-oriented data model to identify and mitigate potential risks,
wherein the management includes generating tests for specific risk controls and validating the validated system against safety and security standards.

16. The computing system of claim 12, the one or more memories, having stored thereon further instructions that, when executed by the computing system, cause the computing system to:
leverage artificial intelligence to analyze items within the object-oriented data model,
wherein the analysis includes generating suggestions for tests based on identified risk controls, identifying requirements without corresponding tests, and providing an overview of system activities to facilitate decision-making.

17. The computing system of claim 16, wherein the artificial intelligence comprises a language model configured to receive queries related to management of quality procedures and change management, and to provide responses based on the received data integrated into the object-oriented data model.

18. The computing system of claim 12, wherein the one or more artifacts are used for regulatory approval by a regulator.

19. The computing system of claim 12, the one or more memories, having stored thereon further instructions that, when executed by the computing system, cause the computing system to:
authenticate electronic signatures associated with changes to configuration items within the object-oriented data model,
wherein the authentication complies with regulatory requirements for electronic signatures, ensuring that each change is verified and authorized according to predetermined regulatory standards.

20. A non-transitory computer-readable medium having stored thereon instructions that, when executed by a computer, cause the computer to:
receive data from a plurality of remote systems associated with a validated system, wherein the received data comprises information related to at least one of requirements, specifications, tests, risks, anomalies, complaints, change requests, corrective and preventive actions, dependencies, or other configuration items associated with the validated system;

integrate the received data into an object-oriented data model for managing quality procedures and change management in a development and release of the validated system, wherein the integration includes parsing the received data using a plurality of parsers each configured for a respective remote system of the plurality of remote systems, mapping the parsed data to corresponding items within the object-oriented data model, and synchronizing changes between the plurality of remote systems and the object-oriented data model by polling the plurality of remote systems through respective application programming interfaces to programmatically detect changes;

dynamically update the received data from the plurality of remote systems by interacting with the object-oriented data model to identify one or more discrepancies between expected relationships among objects within the object-oriented data model using an artificial intelligence model trained to identify one or more discrepancies between the objects within the object-oriented data model by determining whether each object within the object-oriented data model is properly associated with corresponding (i) tests, (ii) requirements, or (iii) specifications; and generate one or more artifacts, wherein the one or more artifacts are automatically generated based on the integration of the received data, h synchronization of the changes, and the updating of the received data from the plurality of remote systems.

\* \* \* \* \*